US012248059B2

(12) United States Patent
Kim et al.

(10) Patent No.: US 12,248,059 B2
(45) Date of Patent: Mar. 11, 2025

(54) WIDEBAND-ASSISTED ULTRA-WIDEBAND (UWB) SENSING

(71) Applicant: QUALCOMM Incorporated, San Diego, CA (US)

(72) Inventors: Dongsik Kim, San Diego, CA (US); Koorosh Akhavan, San Diego, CA (US); Anand Srinivas Guruswamy, San Diego, CA (US); Damith Nivantha Senaratne, San Diego, CA (US); Le Nguyen Luong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/931,470

(22) Filed: Sep. 12, 2022

(65) Prior Publication Data

US 2024/0085552 A1 Mar. 14, 2024

(51) Int. Cl.
*H04L 25/02* (2006.01)
*G01S 13/76* (2006.01)
*G01S 13/87* (2006.01)

(52) U.S. Cl.
CPC .......... *G01S 13/765* (2013.01); *G01S 13/878* (2013.01)

(58) Field of Classification Search
CPC ................. G01S 13/765; G01S 13/878; H04B 2201/71634; H04B 1/71637; H04L 25/0204; H04L 25/0212
See application file for complete search history.

(56) References Cited

U.S. PATENT DOCUMENTS

| | | | |
|---|---|---|---|
| 10,327,221 B1 | 6/2019 | Sarrigeorgidis | |
| 2022/0113365 A1* | 4/2022 | Sosnin | ................ H04W 64/00 |
| 2022/0283321 A1 | 9/2022 | Ng et al. | |
| 2023/0291610 A1* | 9/2023 | Pakrooh | .............. H04L 25/0212 |

OTHER PUBLICATIONS

Bas C.U., et al., "Real-Time Ultra-Wideband Channel Sounder Design for 3-18 GHz", IEEE Transactions on Communications, IEEE Service Center, Piscataway, NJ, USA, vol. 67, No. 4, Apr. 1, 2019, XP011719742, pp. 2995-3008, The Whole Document.
International Search Report and Written Opinion—PCT/US2023/071123—ISA/EPO—Nov. 2, 2023.
LEONG; et al., "UWB Sensing in 802.15" Presentation, UWB in Project: IEEE P802.15 Working Group for Wireless Personal Area Networks (WPANs), 15-21-0399-00-04ab-uwb-sensing-in-802-15, Jul. 2021, 14 pages.

* cited by examiner

*Primary Examiner* — Fred A Casca
(74) *Attorney, Agent, or Firm* — Weaver Austin Villeneuve & Sampson LLP/QUALCOMM

(57) ABSTRACT

An example method of ultra-wideband (UWB) sensing performed by a wireless communication device, the method comprising determining a first channel impulse response (CIR) estimation of a first frequency channel based on a radio access technology (RAT) session, wherein the RAT is different from UWB. The method also comprises determining a second CIR estimation of a second frequency channel based on a UWB session and determining a third CIR estimation of the first frequency channel based on determining a phase difference between the third CIR estimation and the first CIR estimation. The method further comprises determining a total CIR estimation for a combined frequency channel comprising the first frequency channel and the second frequency channel based on stitching the first CIR estimation, the second CIR estimation, and the third CIR estimation.

21 Claims, 9 Drawing Sheets

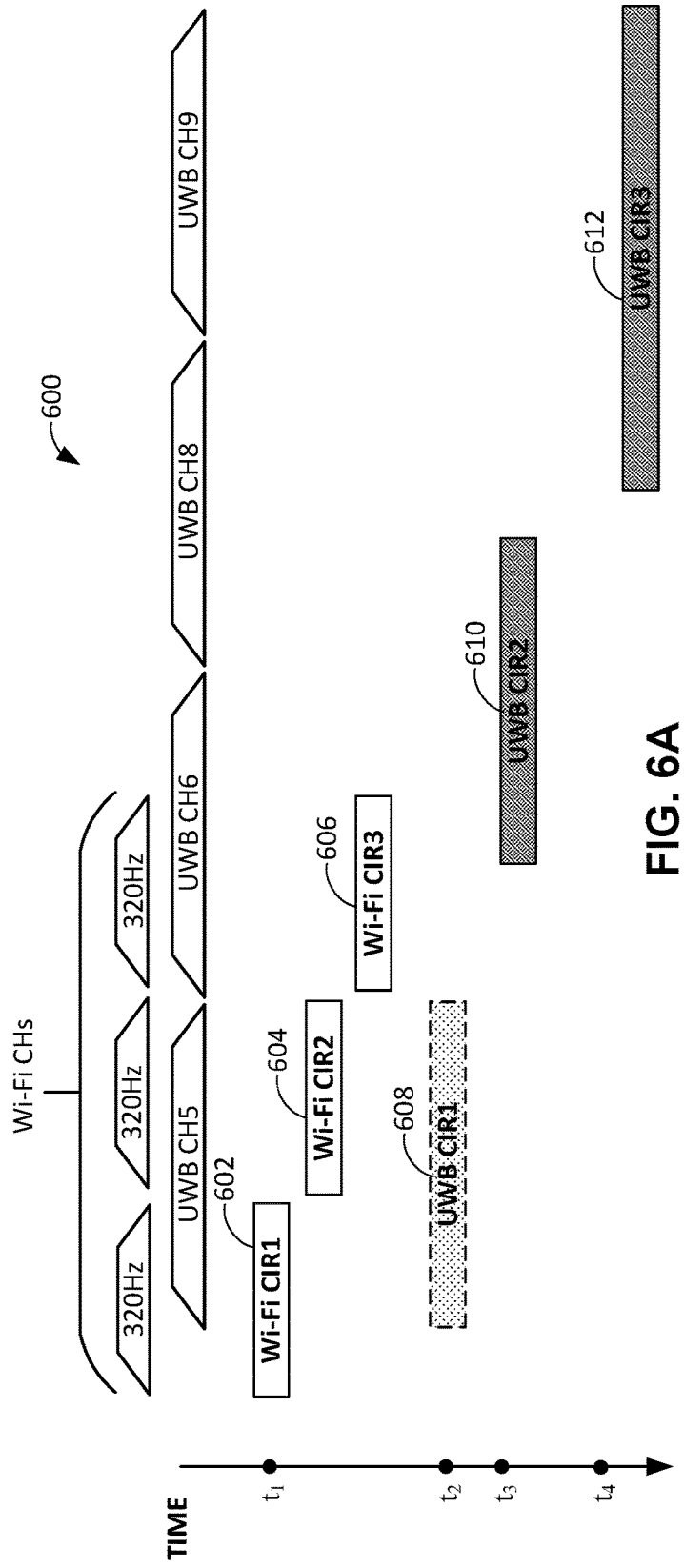
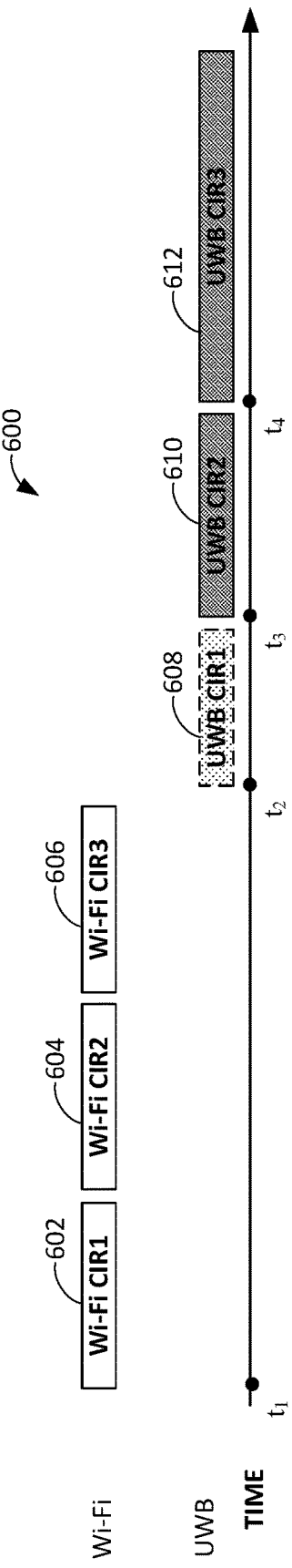
FIG. 6A
FIG. 6B

WIDEBAND-ASSISTED ULTRA-WIDEBAND (UWB) SENSING

BACKGROUND

1. Field of Disclosure

The present disclosure relates generally to the field of radiofrequency (RF)-based sensing (e.g., position determination/positioning) of an electronic wireless device. More specifically, the present disclosure relates to ultra-wideband (UWB)-based sensing.

2. Description of Related Art

The sensing of devices can have a wide range of consumer, industrial, commercial, military, and other applications. UWB-based positioning offers a highly accurate, low-power positioning solution relative to other RF-based sensing techniques for wireless electronic devices.

BRIEF SUMMARY

An example method of ultra-wideband (UWB) sensing performed by a wireless communication device, the method comprising determining a first channel impulse response (CIR) estimation of a first frequency channel based on a radio access technology (RAT) session, wherein the RAT is different from UWB. The method also comprises determining a second CIR estimation of a second frequency channel based on a UWB session and determining a third CIR estimation of the first frequency channel based on determining a phase difference between the third CIR estimation and the first CIR estimation. The method further comprises determining a total CIR estimation for a combined frequency channel comprising the first frequency channel and the second frequency channel based on stitching the first CIR estimation, the second CIR estimation, and the third CIR estimation.

An example transmitting device in a wireless communication network, comprising a wireless communication interface, a memory, and one or more processing units communicatively coupled to the wireless communication interface and the memory. The one or more processing units are configured to determine a first channel impulse response (CIR) estimation of a first frequency channel based on a radio access technology (RAT) session, wherein the RAT is different from UWB. The one or more processing units are also configured to determine a second CIR estimation of a second frequency channel based on a UWB session and determine a third CIR estimation of the first frequency channel based on determining a phase difference between the third CIR estimation and the first CIR estimation. The one or more processing units are also configured to determine a total CIR estimation for a combined frequency channel comprising the first frequency channel and the second frequency channel based on stitching the first CIR estimation, the second CIR estimation, and the third CIR estimation.

An example non-transitory computer-readable medium having instructions stored for providing driving assistance information, wherein the instructions, when executed by one or more processors of a mobile device, cause the one or more processors to determine a first channel impulse response (CIR) estimation of a first frequency channel based on a radio access technology (RAT) session, wherein the RAT is different from UWB. When executed by one or more processors of a mobile device, the instructions also cause the one or more processors to determine a second CIR estimation of a second frequency channel based on a UWB session and determine a third CIR estimation of the first frequency channel based on determining a phase difference between the third CIR estimation and the first CIR estimation. When executed by one or more processors of a mobile device, the instructions further cause the one or more processors to determine a total CIR estimation for a combined frequency channel comprising the first frequency channel and the second frequency channel based on stitching the first CIR estimation, the second CIR estimation, and the third CIR estimation.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 6A and 6B are a block diagrams illustrating an example UWB sensing phase with the CIR estimation stitching, according to some embodiments.

Figure 1:
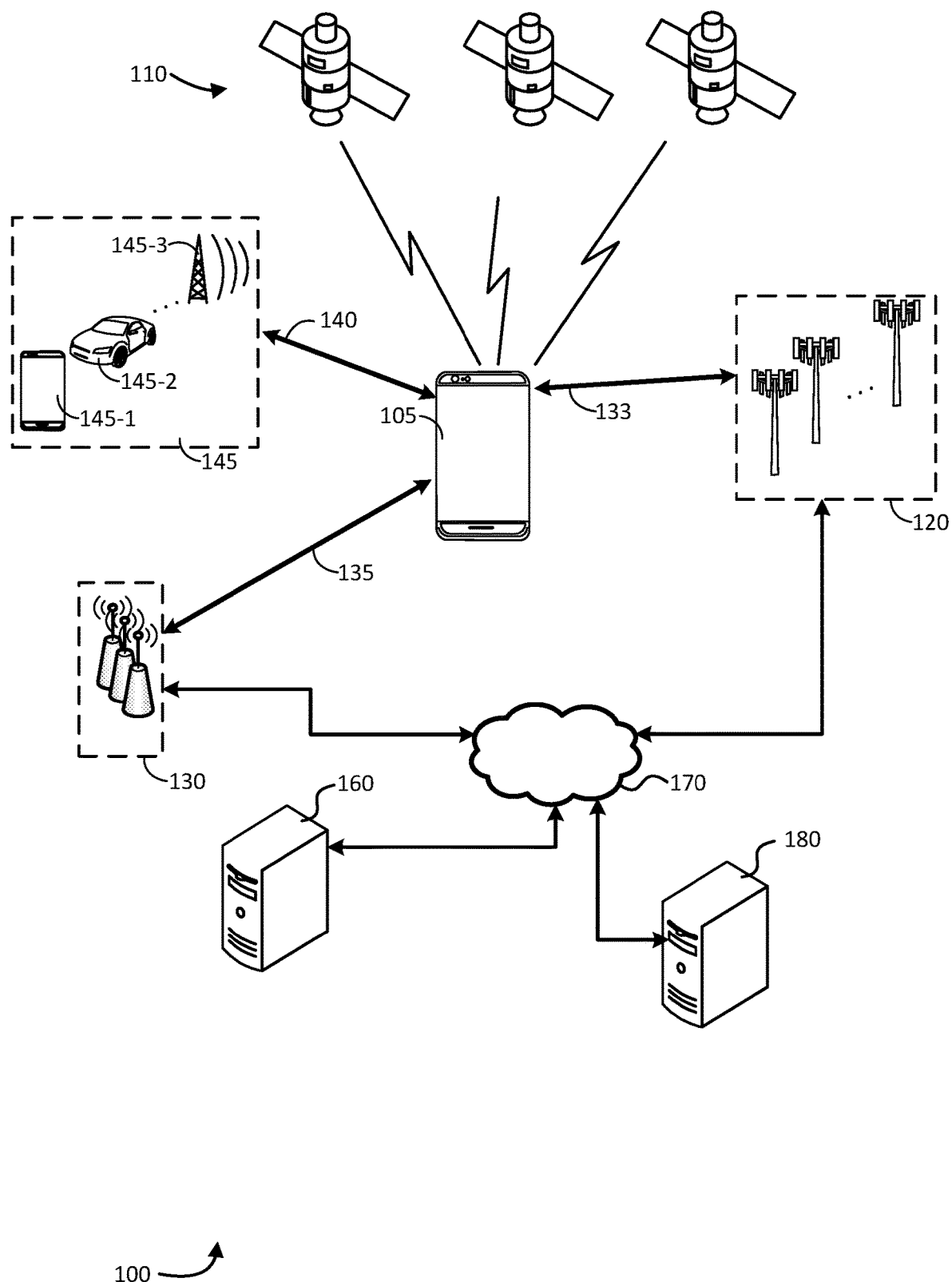
FIG. 1 is a simplified illustration of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the "positioning" is a nonlimiting example implementation of "sensing" and the term "positioning" as used herein (including, for example, UWB-based positioning, cellular-based positioning, and hybrid cellular/UWB positioning) may include absolute location determination, relative location determination, ranging, or a combination thereof. Such positioning may include and/or be based on timing, angular, phase, or power measurements, or a combination thereof (which may include RF sensing measurements) for the purpose of location or sensing services.

As previously noted, UWB-based positioning offers a highly-accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system. FIG. 1 provides an example of such a positioning system.

As will be disclosed in detail below, high-resolution channel impulse response (CIR) is one of the key techniques in UWB sensing utilized for various purposes such as health monitoring, gesture recognition, positioning, radar, etc. The resolution of the CIR in time domain is limited by the inverse of the bandwidth of the frequency channel(s) available to the CIR. The insufficient resolution prevents the separation of line-of-sight (LOS) path from closely arriving multipath components, leading to biased rage estimates and degraded localization performance. Accordingly, it would be advantages stitching multiple CIRs estimated over different UWB frequency channels (e.g., UWB channels 5, 6, 8, and 9) to increase the bandwidth of the frequency channel(s) available to the CIR.

However, some available UWB frequency channels (e.g., UWB channels 5 and 6) overlap with the bandwidth of other type of RF wireless communications components (also referred as "radio access technology (RAT)") such as New Radio (NR), Wi-Fi, etc. Because of the overlap, on those overlapping frequency channels, the quality of performing the UWB CIRs may be negatively impacted, and the data transmission of those RF wireless communications may be interfered as well. Moreover, on devices where antennas are shared for receiving RF signals (e.g., UWB signals, Wi-Fi signals, and/or NR-U signals) by different RF wireless communication modules (e.g., a UWB module, a Wi-Fi module, and/or a NR module), the reception of the UWB signals tends to have a lower priority compared with the reception of other types of RF signals. This may further adversely affect the UWB CIR estimation quality over the overlapping frequency channels.

To address the above-mentioned interference issues, as will be disclosed in detail below, for devices where antennas are shared for communicating RF signals by the UWB module and the other RAT modules, the technical scheme disclosed herein may utilize the other RAT modules (e.g., the Wi-Fi module, and/or NR-U module) to help obtain the UWB frequency channel estimation over the overlapping frequency channels while having the UWB module perform the frequency channel estimation on the non-overlapping frequency channels (e.g., UWB channels 8 and 9). This may allow the UWB module to stay idle over the overlapping channels for most of the time (e.g., only transmit over a short period of time, enough for determining a calibration (e.g., phase offsets) to compensate the frequency channel estimations conducted by the other RF wireless communication modules), and still obtain the UWB frequency channel estimation over the overlapping channels.

The CIR estimation performed by the other RAT modules may then be compensated (e.g., based on performing a phase-compensation to the CIR estimation) based on the calibration and be stitched with the UWB CIR estimations performed over the non-overlapping channels to generate a total CIR estimation for the combined channels (e.g., UWB channels 5, 6, 8, and 9). Accordingly, the bandwidth of the frequency channels available to the UWB CIR may be greatly increased while avoiding competition between the UWB module and the other RAT modules over the overlapping frequency channels.

Accordingly, over the overlapping frequency channels, the interference to the UWB sensing caused by the other RF wireless communications and the interference to data transmission of the other RF wireless communications caused by the UWB sensing may be greatly reduced at the same time.

Both the UWB module and the other RAT modules may benefit from the technical scheme disclosed herein.

FIG. 1 is a simplified illustration of a positioning system 100 in which a mobile device 105, location server 160, and/or other components of the positioning system 100 can use the techniques provided herein for UWB wireless sensing, according to an embodiment. Positioning system 100 may be an example communications/positioning system that is capable of UWB sensing, and other embodiments may involve different types of systems that incorporate UWB sensing. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed hereafter.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include an LTE wireless network, a Fifth Generation (5G) wireless network (also referred to as an NR wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. In a wireless cellular network (e.g., LTE or 5G), the mobile device 105 may be referred to as a user equipment (UE)

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a GNSS such as GPS, GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), UWB, IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 are used in the position determination of a particular mobile device 105, the mobile device 105 for which the position is to be determined may be referred to as the "target mobile device," and each of the other mobile devices 145 used may be referred to as an "anchor mobile device." (In a cellular/mobile broadband network, the terms "anchor UE" and "target UE" may be used.) For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g., to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2A:
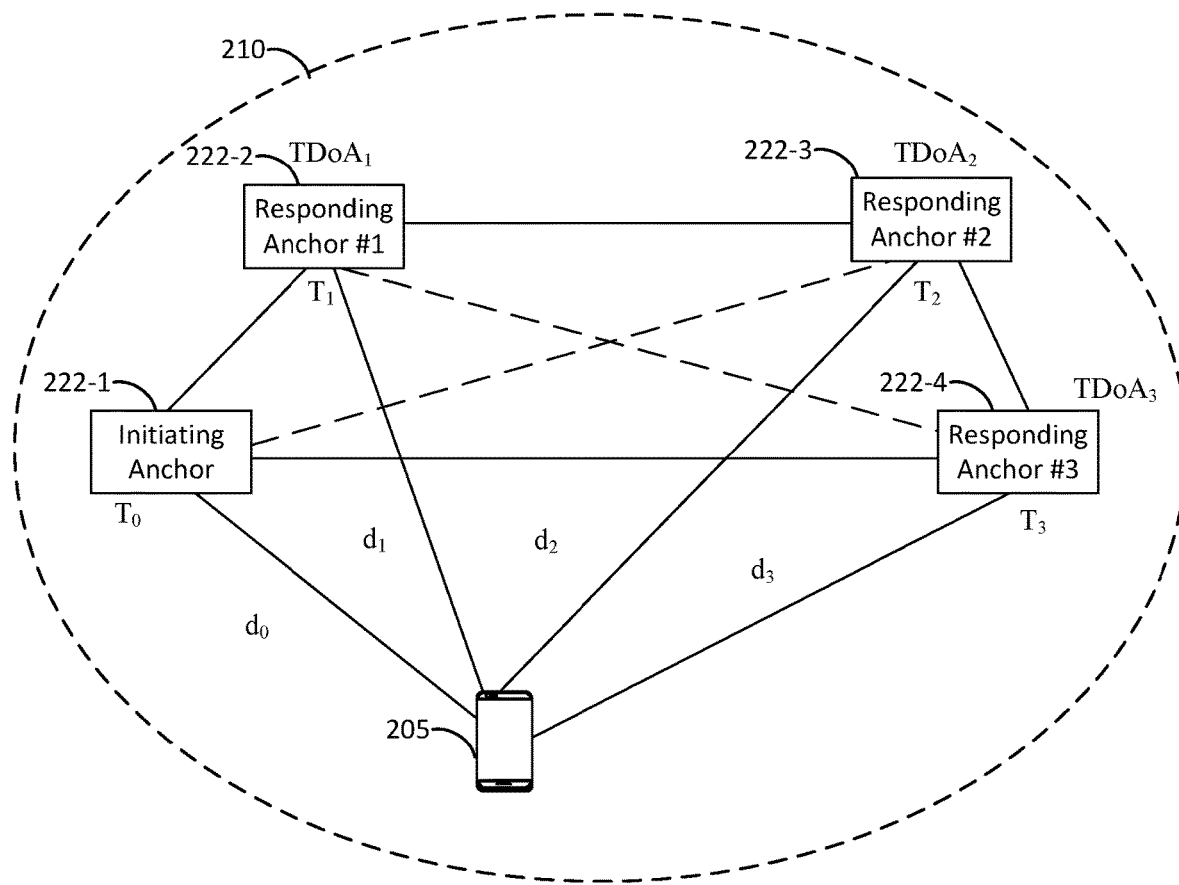
FIG. 2A is a diagram illustrating a scenario in which ultra-wideband (UWB) technologies may be used for positioning a target device.

As will be disclosed herein, "positioning" and/or "ranging" will be described as nonlimiting examples that also may be capable of "sensing" with regard to UWB technologies. Namely, RF sensing may be conducted in conjunction with ranging/positioning/communication, and/or may be conducted independent of ranging/positioning/communication. For example, FIG. 2A is a diagram illustrating a scenario in which UWB technologies may be used for positioning a target device 205 (e.g., a tag). Here, target device 205 may correspond with mobile device 105 of FIG. 1. As illustrated in FIG. 2A, a target device 205 may comprise a wireless communication device within a coverage of a cluster 210. Cluster 210 may include one or more UWB devices (e.g., UWB anchors 222) with known locations that can exchange UWB RF signals (e.g., downlink time difference of arrival (TDoA) signals) with target device 205 for positioning of target device 205. For example, as illustrated in FIG. 2A, UWB anchors 222 may include an initiator 222-1 (e.g., an initiating anchor) and responders 222-2, 222-3, and 222-4 (e.g., responding anchors). The roles of each of the devices (e.g., initiator 222-1 and responders 222-2, 222-3, and 222-4) will be disclosed in detail below. In some embodiments, UWB anchors 222 may be downlink UWB anchors.

When performing positioning/localization of target device 205, target device 205 may send and/or receive UWB RF signals from UWB anchors 222. UWB anchors 222 may use different measurements of the UWB RF signals (e.g., time difference of arrival (TDoA), two-way ranging (TWR), reverse TDoA, and/or phase difference of arrival (PDoA)) to calculate the distance between devices. For example, in a time difference of arrival (TDoA) scheme, target device 205 may send a UWB RF signal (e.g., a "beacon" or a "blink" signal) to each of anchors 222, where each of UWB anchors 222 timestamps the arrival/reception of the UWB RF signal based on a common synchronized time-base. The timestamps from each of UWB anchors 222 may be used for calculating the TDoA for each of the responders (e.g., responders 222-2, 222-3, and 222-4). For example, the TDoA for responders 222-2, $TDoA_1$ (e.g., the time difference between initiator 222-1 and responder 222-2) may be calculated as:

$$TDoA_1 = (d_1 - d_0)/c = T_1 - T_0$$

where $d_0$ and $d_1$ denote the distance between target device 205 and initiator 222-1 and responder 222-2 respectively, c denotes the speed of light, and $T_0$ and $T_1$ denote the timestamps when the UWB RF signal is received by initiator 222-1 and responder 222-2 respectively. The location of target device 205 may be determined based on the TDoAs (e.g., $TDoA_1$, $TDoA_2$, and $TDoA_3$).

Figure 2B:
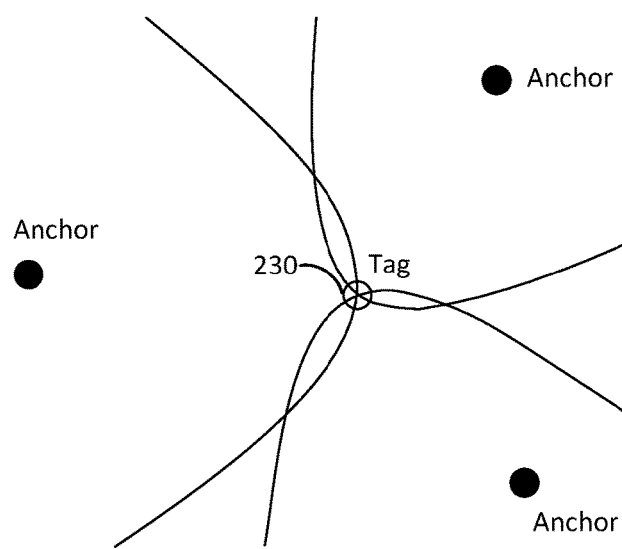
FIG. 2B is a simplified diagram illustrating how UWB positioning of a target device may be performed based on time difference of arrival (TDoA), according to some embodiments.

For example, FIG. 2B is a simplified diagram illustrating how positioning of target device 205 may be performed based on the TDoAs, according to some embodiments. Here, the time difference between the arrival of the UWB RF signal in two anchors (e.g., $TDoA_1$, $TDoA_2$, $TDoA_3$, in FIG. 2A) can be used to calculate hyperbola(s) as illustrated in FIG. 2B. Using multilateration, the location of target device 205 may be determined as the location in which (e.g., circle 230) all the hyperbolas intersect. The result may be a 2D or 3D position for target device 205.

Figure 3A:
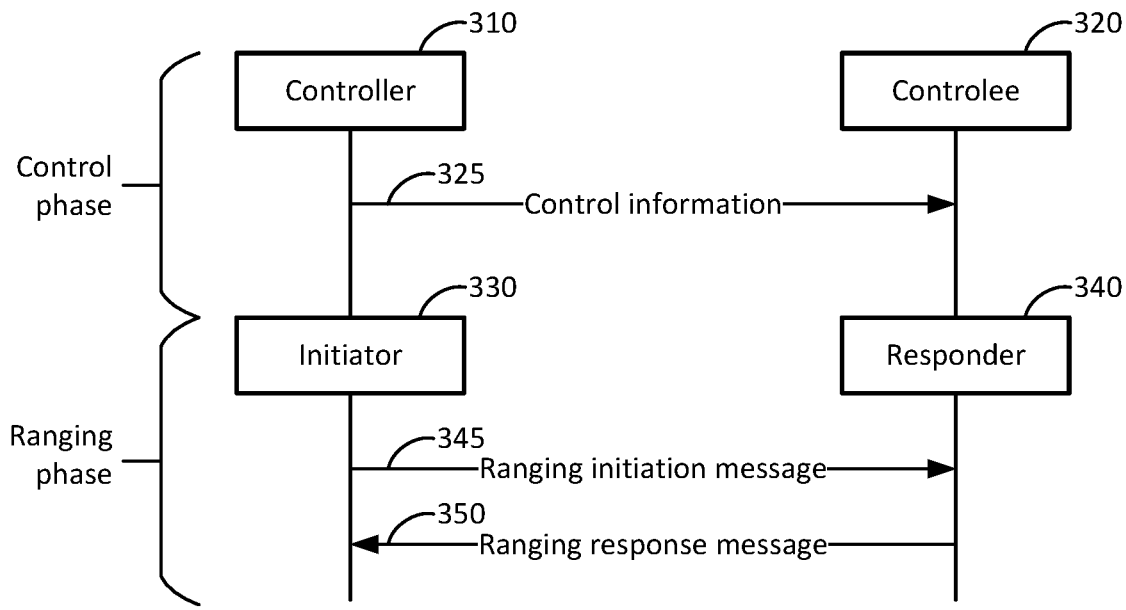
FIGS. 3A and 3B are flow diagrams illustrating the roles different devices may assume with regard to a UWB ranging session.

FIG. 3A is a flow diagram illustrating the roles different devices may assume with regard to a UWB ranging session (or simply a "UWB session"). Here, each UWB device may be referred to as an enhanced ranging device (ERDEV). ERDEVs may be referred to different terminologies (e.g., initiator/responder or controller/controlee) at different layers of the network stack. The terms initiator and responder (described above and hereafter) would be used at lower layers (e.g., at UWB physical (PHY) and media access control (MAC) layers), while the terms controller and controlee (also described hereafter) may be used at higher layers (e.g., an application layer of the ERDEVs). Here, either ERDEV may correspond with a target device 205 or UWB anchors 222 of FIG. 2A, or mobile device 105 of FIG. 1.

As indicated, for a pair of ERDEVs communicating with each other, the controller 310 is an ERDEV that sends control information message 325 to a receiving ERDEV, designated as controlee 320. Control information message 325 may include parameters for the ranging phase of the UWB ranging session, such as timing, channel, etc. Although not illustrated, controlee 320 can send acknowledgment to control information message 325, may negotiate changes to the parameters, and/or the like.

The exchange between controller 310 and controlee 320, including the sending of control information message 325 and subsequent related exchanges between controller 310 and controlee 320 regarding control information, may be conducted out of band (OOB) using a different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 310 and controlee 320 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round. Accordingly, some aspects of the control phase may be considered to occur in band, subsequent to the preliminary OOB exchange between controller 310 and controlee 320.)

The UWB session may occur afterward, in accordance with the parameters provided in the control information. In the ranging phase of the UWB session, one ERDEV may take the role of an initiator 330 and the other ERDEV may take the role of a responder 340. As indicated in FIG. 3A, initiator 330 may initiate UWB ranging by sending a ranging initiation message 345 to responder 340, to which the responder 340 may reply with a ranging response message 350, and timing measurements may be made of these messages (by the devices receiving the messages) to perform the time difference of arrival (TDoA). Depending on the parameters of control information message 325, additional exchanges may be made in the ranging phase between initiator 330 and responder 340 to allow for additional ranging measurements.

Figure 3B:
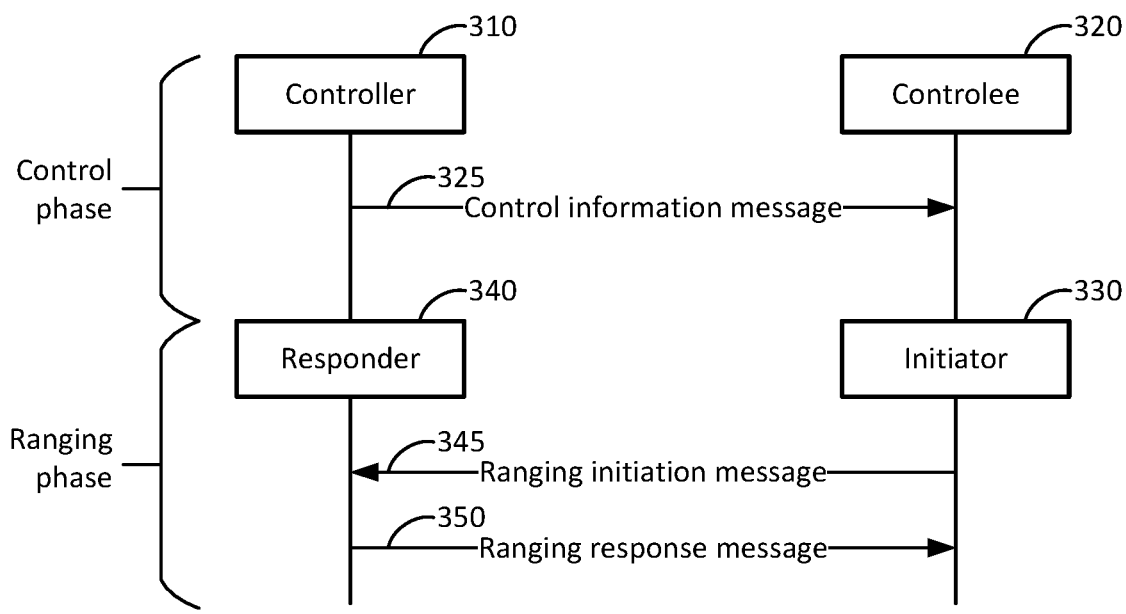

The roles of initiator 330 and responder 340 may be indicated in control information message 325. Further, as indicated in FIG. 3A, controller 310 in the control phase may be initiator 330 in the ranging phase of the UWB session. Alternatively, as indicated in FIG. 3B, controller 310 in the control phase may be responder 340 in the ranging phase. The determination of which device is initiator 330 and which is responder 340 may depend on the parameters set forth in control information 325, in which case controlee 320 correspondingly becomes either responder 340 or initiator 330. According to some embodiments, a controller/initiator may conduct ranging with multiple controlees/responders.

Figure 4:
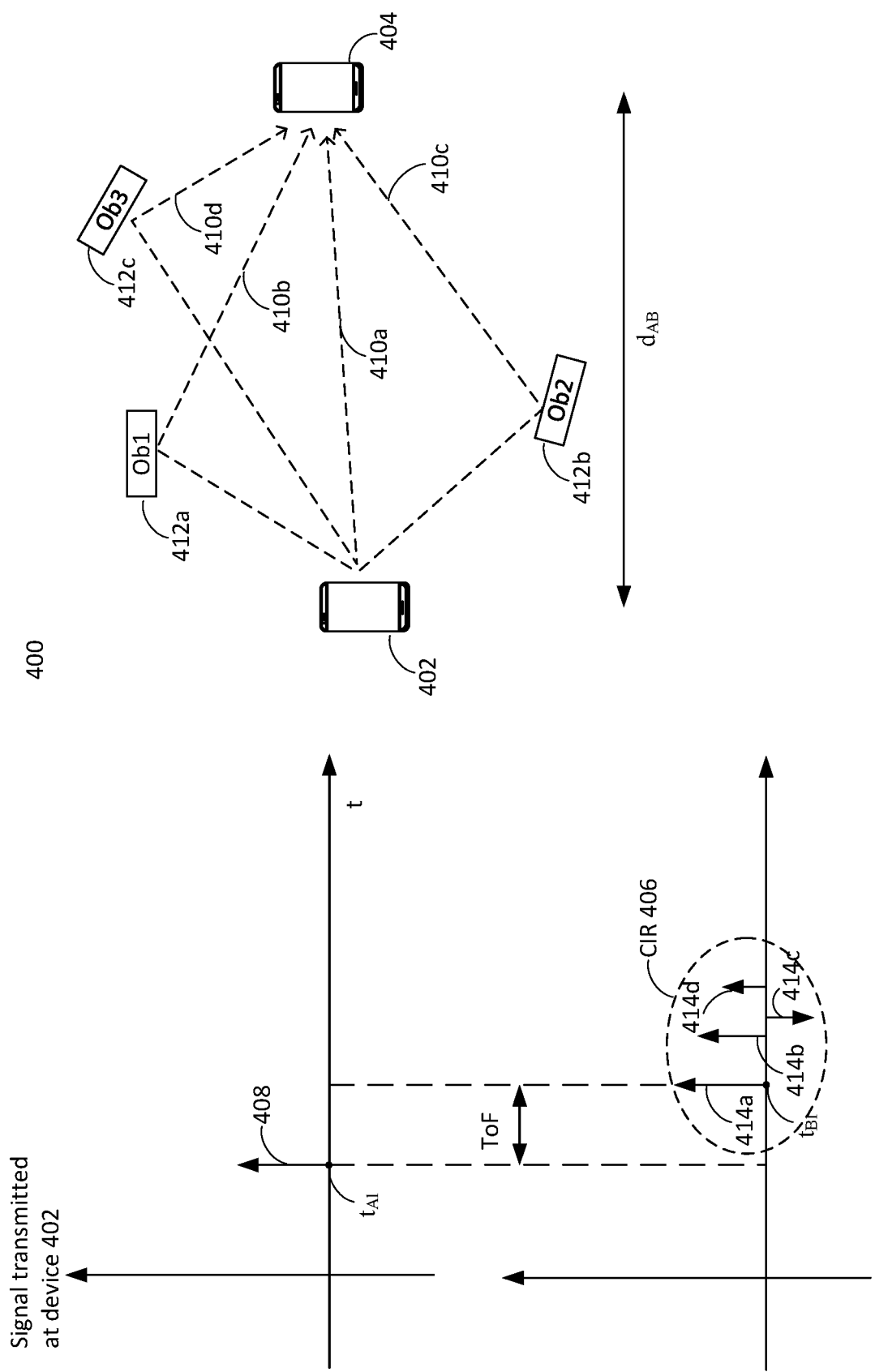
FIG. 4 is a diagram illustrating an example technique for determining CIR.

FIG. 4 is a diagram 400 illustrating an example technique for determining CIR. In some embodiments, the CIR may be performed during a sensing/ranging session illustrated in FIGS. 3A and 3B. In some embodiments, CIR may be performed for channel estimation purposes (e.g., based on computing a correlation between the received signal and the transmitted signal). In some embodiments, to enable a determination of a mutual range or position of devices, a technique used by wireless systems such as UWB is to determine a Channel Impulse Response (CIR) 406. The CIR 406 may represent a profile of direct and indirect (reflected) wireless propagation paths between two devices such as UWB device 402 (e.g., UWB anchors 222 in FIG. 2) and UWB device 404 (e.g., target device 205 in FIG. 2), each path being characterized by its propagation delay, magnitude, and radio frequency (RF) phase. Due to the large bandwidth of UWB, CIRs can be computed with a high level of resolution in UWB, which in turn enables a more precise extraction of the Line-of-Sight (LOS) path and hence TOF/range that corresponds to the first path in the CIR.

For example, as illustrated in diagram 400 of FIG. 4, a pulse 408 is transmitted from UWB device 402 at time $t_{A1}$. In some embodiments, with respect to IR-UWB, the pulse 408 may be viewed as being representative of a long series of pulses. In this example of diagram 400, pulse 408 propagates to UWB device 404 via a series of propagation paths (e.g., paths 410a, 410b, 410c, and 410d). Path 410a is a direct LOS path, while paths 410b, 410c, and 410d are reflections off of different objects (e.g., objects 412a, 412b, and 412c) in the environment. After a bulk delay "ToF" (time-of-flight) 414, representing the distance divided by the speed of light, the signal going through the direct (LOS) path 410a arrives at UWB device 404, as pulse 414a, at time $t_{B1}$. The pulses corresponding to the reflection paths 410b, 410c, and 410d arrive later than the direct paths, as pulses 414b, 414c, and 414d, and their arrival times will depend on the travel distance from UWB device 402 to UWB device 404 via one or multiple reflectors each path is subject to. Note that pulses 414a, 414b, 414c, and 414d are non-limiting examples of a channel impulse response (CIR) 406. In some embodiments, the CIR 406 may enable devices to determine metrics such as the distance $d_{AB}$ based on the ToF which itself is derived off the first arriving pulse 414a.

In some embodiments, to estimate the CIR 406 (e.g., sometimes referred to as "channel sounding"), wireless systems including the UWB module may perform the frequency channel estimation. For example, what may be referred to as "Channel Impulse Response Training Sequences" (CIRTS) may be performed for the frequency channel estimation. The CIRTS may be waveforms known to both the transmitter (e.g., UWB device 402) and the receiver (e.g., UWB device 404) in a link between the two devices. If the transmitter sends out a waveform containing a specific Training Sequence 1 (CIRTS1_TX), the wireless propagation channel with its direct and reflected propagation paths may linearly distort the waveform so that a modified waveform CIRTS1_RX will arrive at the receiver. Since the receiver has advanced knowledge of CIRTS1_TX, it can compare the incoming signal CIRTS1_RX with the known sequence CIRTS1_TX. Then, using the frequency channel estimation (e.g., mathematical algorithms such as correlations) the receiver can estimate the CIR between the transmitter at the transmitter (e.g., UWB device 402) and the receiver (e.g., UWB device 404).

As noted above, on devices where antennas are shared for receiving RF signals (e.g., UWB signals, Wi-Fi signals, and/or NR-U signals) by different RAT modules (e.g., a UWB module, a Wi-Fi module, and/or a NR-U module), the reception of the UWB signals tends to have a lower priority compared with the reception of other types of RF signals. This may adversely affect the UWB CIR estimation quality over the overlapping frequency channels.

To address the above-mentioned interference issues, as will be disclosed in detail below, the technical scheme disclosed herein provides an improved CIR stitching mechanism where CIR estimations over the frequency channels available to the UWB CIR may be obtained with the help of other RAT modules (e.g., Wi-Fi module and/or NR module), and may be compensated (e.g., based on performing a phase-compensation) and stitched to generate a total CIR estimation for the frequency channels available to the UWB CIR. This may increase the bandwidth available to the UWB CIR, and thus increase the resolution of the UWB sensing.

Figure 5:
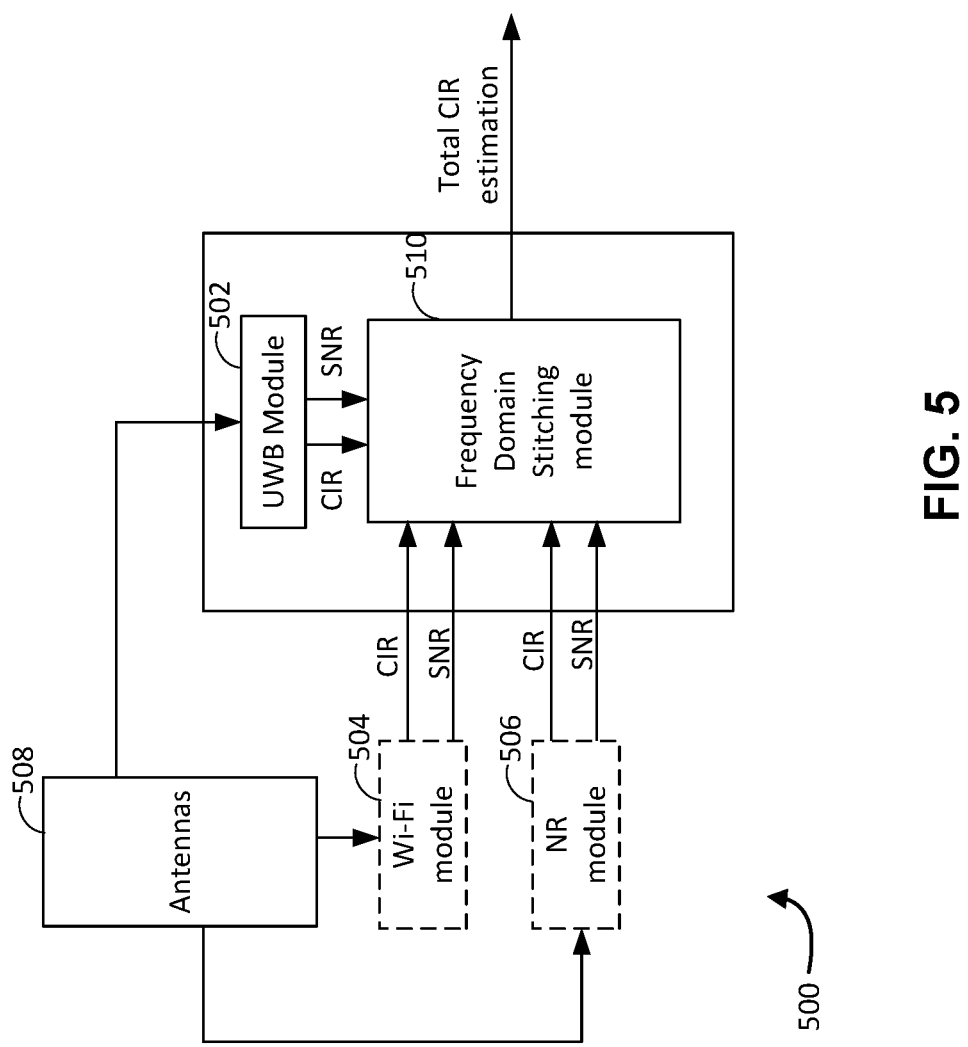
FIG. 5 is a block diagram illustrating a RF device with multiple RAT modules performing UWB sensing with the CIR estimation stitching, according to an embodiment.

For example, FIG. 5 is a block diagram illustrating a RF device 500 with multiple RAT modules performing UWB sensing with the CIR estimation stitching, according to some embodiments. As illustrated in FIG. 5, RF device 500 (e.g., UE 105 in FIG. 1, UWB anchors 222 and/or target device 205 in FIG. 2, any ERDEV in FIG. 3, or UWB device 402 or 404 in FIG. 4) may include a UWB module 502 configured for communicating and processing UWB signals, one or more other RAT modules (e.g., as illustrated in FIG. 5, a Wi-Fi module 504 configured for communicating and processing Wi-Fi signals and a NR module 506 configured for communicating and processing NR signals), antennas 508 shared by UWB module 502 and the one or more other RAT modules (e.g., configured for receiving and transmitting the RF signals for UWB module 502 and the one or more other RAT modules), and a frequency domain stitching module 510 configured to compensate CIR estimations performed by the one or more other RAT modules (e.g., perform a phase-compensation to the CIR estimation) and stitch the compensated CIR estimations with UWB CIR estimations of different UWB frequency channels. As will be disclosed in detail below, UWB module 502, Wi-Fi module 504, NR module 506, and/or frequency domain stitching module 510 may be incorporated into one or more hardware of mobile UWB device 800 and/or stationary UWB device 900 (e.g., the wireless communication interface 830/930) illustrated in FIGS. 8 and 9 respectively.

It is contemplated that Wi-Fi module 504 and NR module 506 disclosed herein are non-limiting examples of the one or more other RAT modules that may help obtain the UWB CIR estimations on different UWB frequency channels. Any other suitable RAT modules operating on frequency channels overlapping with UWB module 502 may be included.

As noted above, Wi-Fi module 504 and NR module 506 may communicate RF signals over frequency channels available to UWB module 502. For example, FIGS. 6A and 6B are a block diagrams illustrating an example UWB sensing phase 600 with the CIR estimation stitching, according to some embodiments. As illustrated in FIG. 6A, Wi-Fi module 504 and/or NR module 506 may operate over frequency channels available to UWB module 502 (e.g., UWB channels 5 and 6).

Instead of competing with Wi-Fi module 504 and/or NR module 506 on the overlapping frequency channels, UWB module 502 may obtain the UWB CIR estimation on the overlapping frequency channels based on the CIR estimation performed by Wi-Fi module 504 and/or NR module 506. For example, on the overlapping frequency channels, Wi-Fi module 504 and/or NR module 506 may perform the CIR estimation (e.g., by apply different windows) while UWB module 502 staying in an idle state. The CIR estimation performed by Wi-Fi module 504 and/or NR module 506 may be compensated (e.g., perform a phase-compensation) based on a calibration (e.g., the phase offset between the CIR estimation performed based on the other RATs and the UWB CIR estimation over the overlapping frequency channels), indicating a difference between the CIR estimation performed based on the other RAT(s) and the UWB CIR estimation performed over the overlapping bandwidth.

In some embodiments, the calibration may be determined by frequency domain stitching module 510. For example, after determining the CIR estimation performed by Wi-Fi module 504 and/or NR module 506, UWB module 502 may operate for a short period of time for a mini-CIR session (e.g., transmit RF signals over the overlapping bandwidth), enough for determining a calibration (e.g., phase offset) of the CIR estimation performed by Wi-Fi module 504 and/or NR module 506. The CIR estimation performed by Wi-Fi module 504 and/or NR module 506, the other channel estimation parameters (e.g., signal to noise ratio (SNR)), and the mini-CIR may be transmitted to frequency domain stitching module 510 for determining the calibration.

Additionally or alternatively, the calibration may be pre-determined at a time point prior to the sensing phase (e.g., during a testing stage).

The UWB module 502 may also perform the UWB CIR estimation over the non-overlapping bandwidth. The UWB CIR estimation performed over the non-overlapping bandwidth, along with the other channel estimation parameters (e.g., signal to noise ratio (SNR)) may also be transmitted by UWB module 502 to frequency domain stitching module 510.

At frequency domain stitching module 510, the CIR estimation performed by Wi-Fi module 504 and/or NR module 506 may be compensated according to the calibration. The CIR estimation performed by Wi-Fi module 504 and/or NR module 506 may also be stitched with the compensated CIR and other UWB CIR estimations (e.g., UWB CIR estimations performed by UWB module 502 over non-overlapping frequency channels such as UWB channels 8 and 9) to generate a total CIR estimation for the combined frequency channel (e.g., including UWB channels 5, 6, 8, and 9). Accordingly, the total CIR estimation over the combined frequency channel (e.g., combining UWB channels 5, 6, 8, and 9) may be output by frequency domain stitching module 510 and the combined frequency channel (e.g., including UWB channels 5, 6, 8, and 9) may be available to the UWB CIR sensing. The UWB sensing resolution may be increased accordingly.

Specifically, as a non-limiting example, when the calibration is determined at frequency domain stitching module 510, UWB module 502 may perform a mini-CIR session (e.g., RF signals lasting for a few shortest packet (e.g., each packet having a duration of about 35 microseconds), enough for determining the calibration. The mini-CIR session may be much shorter than a regular CIR estimation over the overlapping frequency channels (e.g., normally lasting for about a few milliseconds). The mini-CIR session may be transmitted along with other channel estimation parameters (e.g., SNR) to frequency domain stitching module 510. Accordingly, frequency domain stitching module 510 may determine the calibration based on the mini-CIR session, the CIR estimation performed by Wi-Fi module 504 and/or NR module 506, and/or the other channel estimation parameters. For example, frequency domain stitching module 510 may determine the calibration based on determining a phase difference between the mini-CIR session and the CIR estimation performed by Wi-Fi module 504 and/or NR module 506. Accordingly, frequency domain stitching module 510 may compensate the Wi-Fi and/or NR CIR estimation over the overlapping frequency channels based on the calibration.

Additionally or alternatively, the calibration (e.g., the phase offset between the UWB CIR estimation and Wi-Fi and/or NR CIR estimation over the overlapping frequency channels) may be predetermined prior to the sensing phase (e.g., through testing). Accordingly, frequency domain stitching module 510 may obtain the calibration and compensate the Wi-Fi and/or NR CIR estimation over the overlapping frequency channels based on the calibration without obtaining input from UWB module 502 over the overlapping frequency channels.

For example, as illustrated in FIGS. 6A and 6B, at timepoint $t_1$, Wi-Fi module 504 may perform CIR estimations (e.g., Wi-Fi CIR estimations 602, 604, and 606) over the overlapping bandwidth by applying different windows (e.g., sequence of impulses) according to the duration of each session.

In some embodiments, optionally, if the calibration is determined at frequency domain stitching module 510 shown in FIG. 5, at time point $t_2$, UWB module 502 may perform a mini-CIR session 608 over UWB channel 5, enough for determining a calibration of Wi-Fi CIR estimations 602 and 604 over UWB channel 5 (e.g., a phase offset between a UWB CIR estimation over UWB channel 5 and Wi-Fi CIR estimations 602 and 604). Additionally or alternatively, if the calibration is predetermined (e.g., obtained prior to the sensing phase), mini-CIR session 608 may be omitted in UWB sensing phase 600.

At time point $t_3$, UWB module 502 may perform a UWB CIR estimation 610 over UWB channels 6 and 8. As shown in FIG. 6A, UWB CIR estimation 610 may overlap with a portion of Wi-Fi CIR estimation 606 over UWB channel 6. A calibration (e.g., phase offset) between Wi-Fi CIR estimation 606 and UWB CIR estimation 610 may be determined for determining the UWB CIR estimation over the entire bandwidth covered by UWB CIR estimation 610. For example, the calibration may indicate phase offsets between Wi-Fi CIR estimation 606 and UWB CIR estimation 610 over the overlapping bandwidth (e.g., a portion of UWB channel 6).

The calibration may be determined based on determining a phase offset between 1. Wi-Fi CIR estimation 606 and UWB CIR estimation 610 over the overlapping bandwidth (e.g., a portion of UWB channel 6) of UWB CIR estimation 610 and/or 2. Wi-Fi CIR estimation 606 and non-overlapping bandwidth of UWB CIR estimation 610 (e.g., a portion of UWB channel 8). As noted above, Wi-Fi CIR estimation 606 may be compensated by e.g., frequency domain stitching module 510 shown in FIG. 5 based on the calibration.

At time point $t_4$, one or more regular UWB CIR estimations 612 may be performed over the non-overlapping frequency channels (e.g., UWB channels 8 and 9) to provide a channel estimation over the rest bandwidth of the UWB frequency channels available to the UWB CIR sensing.

Accordingly, as noted above, all available CIR estimations such as the Wi-Fi CIR estimations 602, 604, and 606, the compensated Wi-Fi CIR estimations 602, 604, and 606, and UWB CIR estimations 610 and 612 may be stitched at frequency domain stitching module 510 shown in FIG. 5 to generate a combined CIR estimation for the UWB channels that are available to UWB CIR sensing (e.g., UWB channels 5, 6, 8, and 9).

It is noted that CIR estimation stitching process disclosed herein is only providing a non-limiting example for illustrative purposes. For example, the Wi-Fi CIR estimations herein may also be other CIR estimations based on other suitable RAT(s). The number of sessions of CIR estimation and/or the duration of each CIR estimation (e.g., the windows applied) may also be different for desired performance. It is also noted that the time and frequency spans for each CIR estimations illustrated in FIGS. 6A and 6B are not according to the actual scales. Also, the CIR estimations performed in FIGS. 6A and 6B may be in an order different than the order disclosed herein and some of the CIR estimations may be performed simultaneously. For example, one or more regular UWB CIR estimations 612 may be performed prior to or simultaneously with any or all of Wi-Fi CIR estimations 602, 604, and 606, mini-CIR session 608, and/or UWB CIR estimations 610.

Figure 7:
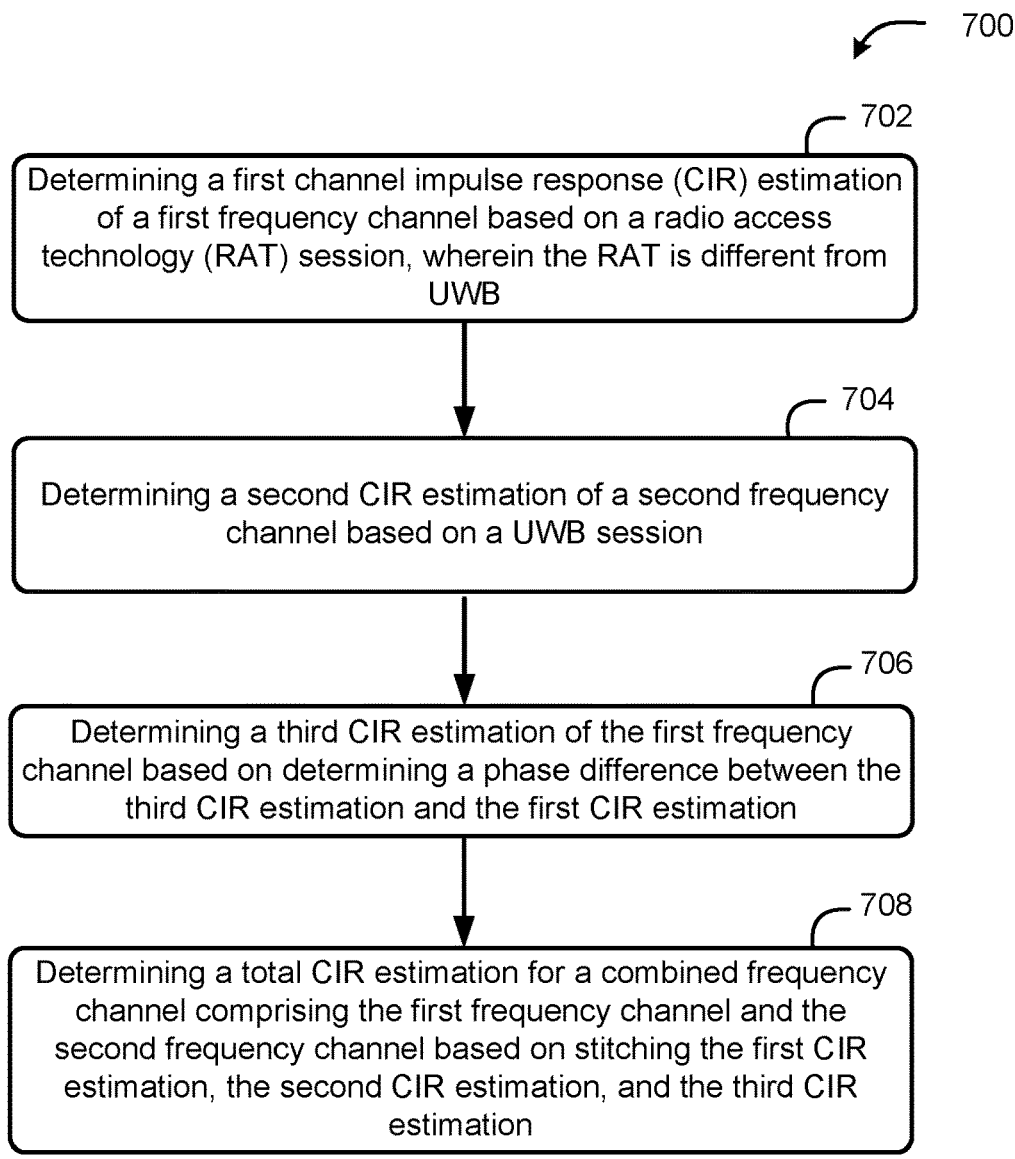
FIG. 7 is a flow diagram of a method of UWB sensing with the CIR estimation stitching, according to an embodiment.

FIG. 7 is a flow diagram of a method 700 of UWB sensing with CIR estimation stitching, according to an embodiment. Means for performing the functionality illustrated in one or more of the blocks shown in FIG. 7 may be performed by hardware and/or software components of a UWB device. Example components of UWB devices are illustrated in FIGS. 8 and 9 which are described in more detail below.

At block 702, the functionality includes determining a first channel impulse response (CIR) estimation of a first frequency channel based on a radio access technology (RAT) session (e.g., Wi-Fi CIR estimations 602, 604, and 606 in FIG. 6 and/or UR CIR estimations). As noted, according to some embodiments, Wi-Fi module 504 shown in FIG. 5 may perform CIR estimations (e.g., Wi-Fi CIR estimations 602, 604, and 606 shown in FIG. 6) over the overlapping bandwidth (e.g., shared with UWB module 502) by applying different windows (e.g., sequence of impulses) according to the duration of each session.

Figure 8:
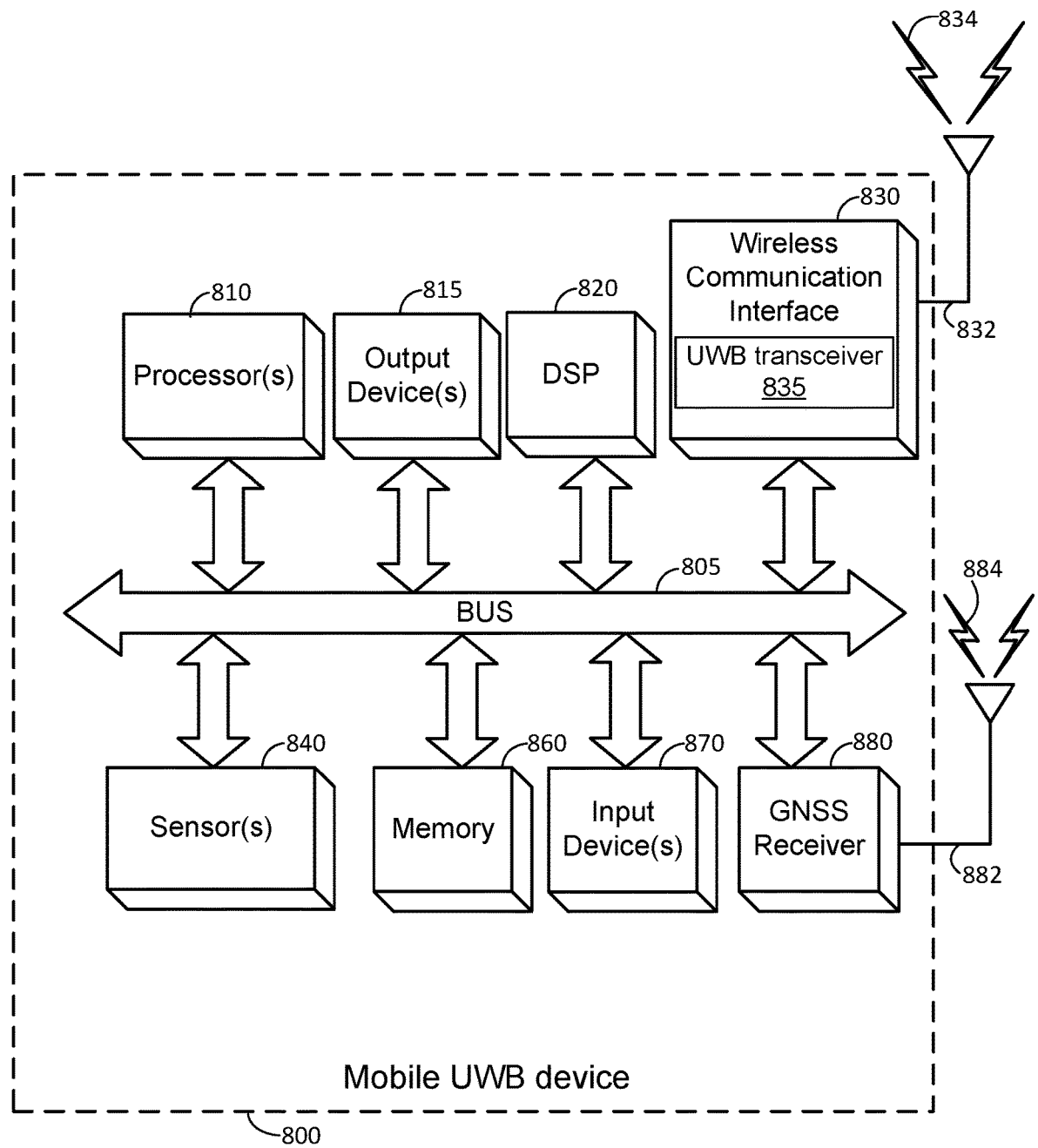
FIG. 8 is a block diagram of an embodiment of a mobile UWB device, according to an embodiment.
Figure 9:
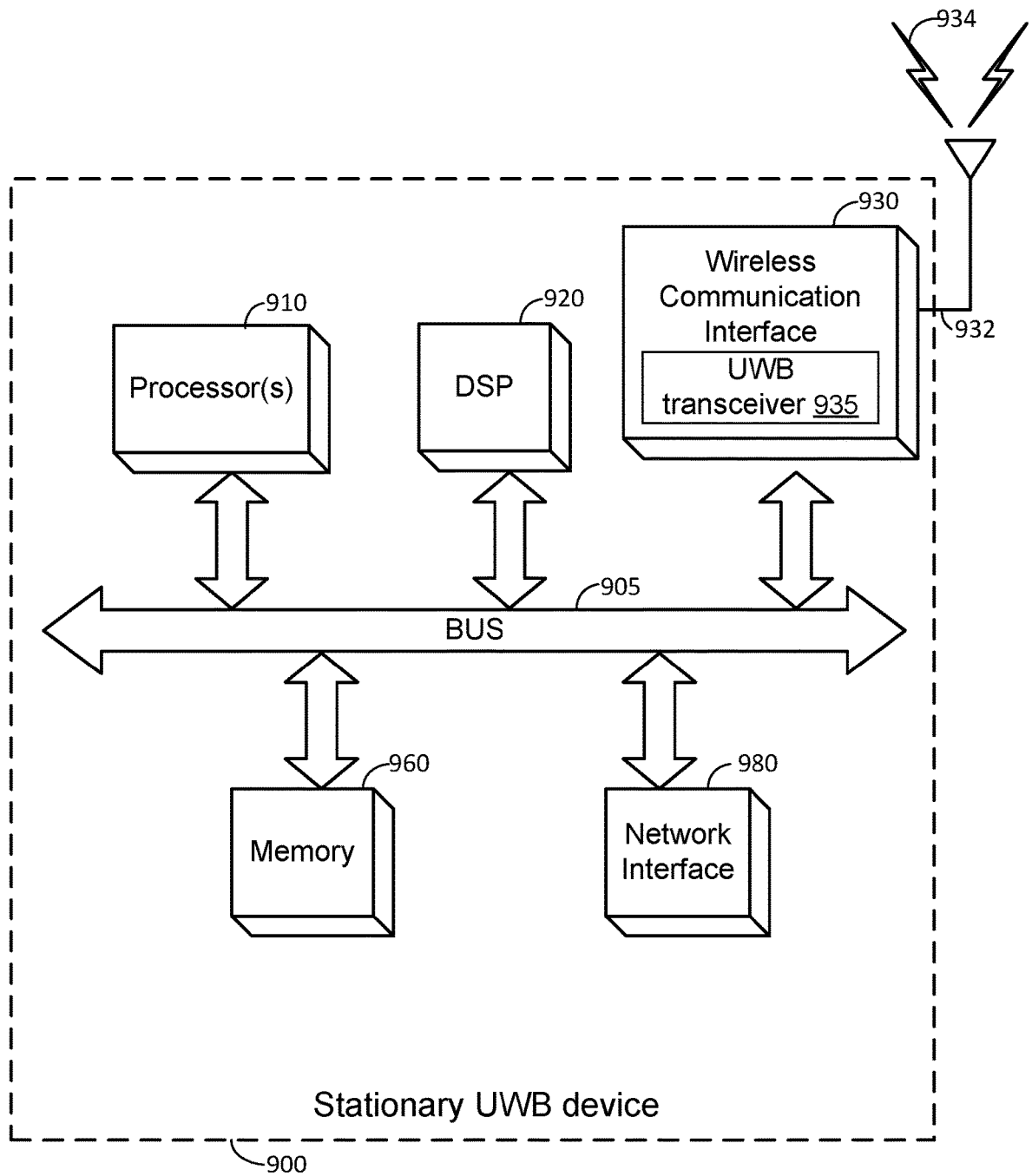
FIG. 9 is a block diagram of an embodiment of a stationary UWB device, according to an embodiment.

Means for performing functionality at block 702 may comprise a bus 805, processor(s) 810, memory 860, wireless communication interface 830 (including optional UWB transceiver 835), and/or other components of a mobile UWB device 800 as illustrated in FIG. 8 and described hereafter. Means for performing functionality at block 702 may also comprise a bus 905, processor(s) 910, memory 960, wireless communication interface 930 (including optional UWB transceiver 935), and/or other components of a stationary UWB device 900 as illustrated in FIG. 9 and described hereafter.

The functionality at block 704 includes determining a second CIR estimation of a second frequency channel based on a UWB session. As noted above, one or more regular UWB CIR estimations (e.g., UWB CIR estimations 612) may be performed over the non-overlapping frequency channels (e.g., UWB channels 8 and 9) to provide a channel estimation over the non-overlapping bandwidth of the UWB frequency channels available to the UWB CIR sensing.

Means for performing functionality at block 704 may comprise a bus 805, processor(s) 810, memory 860, wireless communication interface 830 (including optional UWB transceiver 835), and/or other components of a mobile UWB device 800 as illustrated in FIG. 8 and described hereafter. Means for performing functionality at block 704 may also comprise a bus 905, processor(s) 910, memory 960, wireless communication interface 930 (including optional UWB transceiver 935), and/or other components of a stationary UWB device 900 as illustrated in FIG. 9 and described hereafter.

The functionality at block 706 includes determining a third CIR estimation of the first frequency channel based on determining a phase difference between the third CIR estimation and the first CIR estimation. As noted above, in some embodiments, the phase difference may be determined at frequency domain stitching module 510 shown in FIG. 5. For example, the UWB module (e.g., UWB module 502) may perform a mini-CIR session (e.g., RF signals lasting for a few shortest packet (e.g., each packet having a duration of about 35 microseconds), enough for determining the phase difference. The mini-CIR session may be much shorter than a regular CIR estimation over the overlapping frequency channels (e.g., normally lasting for about a few milliseconds).

The mini-CIR session may be transmitted along with other channel estimation parameters (e.g., SNR) to frequency domain stitching module 510. Accordingly, frequency domain stitching module 510 may determine the phase difference the CIR estimation performed by Wi-Fi module 504 and/or NR module 506 based on the mini-CIR session, the CIR estimation performed by Wi-Fi module 504 and/or NR module 506, and/or the other channel estimation parameters. For example, if the calibration is determined at frequency domain stitching module 510, as illustrated in FIGS. 5, 6A, and 6B, UWB module 502 may perform a mini-CIR session 608 over UWB channel 5, enough for determining a phase difference of Wi-Fi CIR estimations 602 and 604 over UWB channel 5 (e.g., a phase offset between a UWB CIR estimation over UWB channel 5 and Wi-Fi CIR estimations 602 and 604).

Additionally or alternatively, the phase offset between the UWB CIR estimation and Wi-Fi and/or NR CIR estimation over the overlapping frequency channels may be predetermined prior to the sensing phase (e.g., through testing). Accordingly, frequency domain stitching module 510 may obtain the calibration without obtaining input from UWB module 502 over the overlapping frequency channels. For example, if the calibration is predetermined (e.g., obtained prior to the sensing phase), as illustrated in FIGS. 5, 6A, and 6B, mini-CIR session 608 may be omitted in UWB sensing phase 600.

In some embodiments, frequency domain stitching module 510 may determine the third CIR estimation based on compensating the Wi-Fi and/or NR CIR estimation over the overlapping frequency channels using the phase difference. The third CIR estimation may be equivalent to a UWB CIR estimation performed over the same frequency channel.

Means for performing functionality at block 706 may comprise a bus 805, processor(s) 810, memory 860, wireless communication interface 830 (including optional UWB transceiver 835), and/or other components of a mobile UWB device 800 as illustrated in FIG. 8 and described hereafter. Means for performing functionality at block 706 may also comprise a bus 905, processor(s) 910, memory 960, wireless communication interface 930 (including optional UWB transceiver 935), and/or other components of a stationary UWB device 900 as illustrated in FIG. 9 and described hereafter.

At block 708, the functionality includes determining a total CIR estimation for a combined frequency channel comprising the first frequency channel and the second frequency channel based on stitching the first CIR estimation, the second CIR estimation, and the third CIR estimation. For example, as shown in FIGS. 5, 6A, and 6B, all available CIR estimations (e.g., the Wi-Fi CIR estimations 602, 604, and 606, the compensated Wi-Fi CIR estimations 602, 604, and 606, and UWB CIR estimations 610 and 612) may be stitched at frequency domain stitching module 510 to generate a combined CIR estimation for the UWB channels that are available to UWB CIR sensing (e.g., UWB channels 5, 6, 8, and 9).

Means for performing functionality at block 708 may comprise a bus 805, processor(s) 810, memory 860, wireless communication interface 830 (including optional UWB transceiver 835), and/or other components of a mobile UWB device 800 as illustrated in FIG. 8 and described hereafter. Means for performing functionality at block 708 may also comprise a bus 905, processor(s) 910, memory 960, wireless communication interface 930 (including optional UWB transceiver 935), and/or other components of a stationary UWB device 900 as illustrated in FIG. 9 and described hereafter.

FIG. 8 is a block diagram of an embodiment of a mobile UWB device 800, which can be utilized as described herein. The mobile UWB device 800 may have cellular (e.g., 5G NR) capabilities and may therefore function as a UE in a cellular wireless network and/or perform cellular/UWB positioning as described herein. It should be noted that FIG. 8 is meant only to provide a generalized illustration of various components, any or all of which may be utilized as appropriate. For example, more basic/simple types of UWB devices may omit various components that may be included in more advanced/complex UWB devices. Furthermore, as previously noted, the functionality of the UE discussed in the previously described embodiments may be executed by one or more of the hardware and/or software components illustrated in FIG. 8.

The mobile UWB device 800 is shown comprising hardware elements that can be electrically coupled via a bus 805 (or may otherwise be in communication, as appropriate). The hardware elements may include processor(s) 810 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 810 may comprise one or more processing units, which may be housed in a single integrated circuit (IC) or multiple ICs. As shown in FIG. 8, some embodiments may have a separate DSP 820, depending on desired functionality. Location determination and/or other determinations based on wireless communication may be provided in the processor(s) 810 and/or wireless communication interface 830 (discussed below). The mobile UWB device 800 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The mobile UWB device 800 may also include a wireless communication interface 830, which may comprise without limitation a modem, a network card, an infrared communication device, a wireless communication device, and/or a chipset (such as a Bluetooth® device, an IEEE 802.8 device, an IEEE 802.15.4 device, a Wi-Fi device, a WiMAX device, a WAN device, and/or various cellular devices, etc.), and/or the like, which may enable the mobile UWB device 800 to communicate with other devices as described herein. The wireless communication interface 830 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

As illustrated, the wireless communication interface 830 may further comprise a UWB transceiver 835. The UWB transceiver 835 may be operated to perform the UWB operations described herein. Further, the wireless communications interface 830 may comprise one or more additional communication technologies with which any OOB functionalities described herein may be performed. According to some embodiments, the UWB transceiver 835 may be one of a plurality of UWB transceivers of the mobile UWB device 800. Further, the UWB transceiver may be used for functionality in addition to the UWB positioning functionality described herein. Although illustrated as part of the wireless communication interface 830, the UWB transceiver 835 may be separate from the wireless communication interface 830 in some embodiments.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 800 may communicate with different data networks that may comprise various network types. For example, a WWAN may be a CDMA network, a TDMA network, a FDMA network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 800 can further include sensor(s) 840. Sensor(s) 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 800 may also include a GNSS receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the mobile UWB device 800, using conventional techniques, from GNSS satellites of a GNSS system, such as GPS, Galileo, GLONASS, Quasi-Zenith Satellite System (QZSS) over Japan, IRNSS over India, BeiDou Navigation Satellite System (BDS) over China, and/or the like. Moreover, the GNSS receiver 880 can be used with various+storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile UWB device 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the mobile UWB device 800 (and/or processor(s) 810 or DSP 820 within mobile UWB device 800). In some embodiments, then, such code and/or instructions can be used to configure and/or adapt a general-purpose computer (or other device) to perform one or more operations in accordance with the described methods.

FIG. 9 is a block diagram of an embodiment of a stationary UWB device 900, which can be utilized as described herein. The stationary UWB device 900 may, for example, function as a UWB anchor for UWB and/or hybrid cellular/UWB positioning of a mobile UWB device (e.g., mobile UWB device 800). It should be noted that FIG. 9 is meant only to provide a generalized illustration of various components, any or all of which may be utilized as appropriate. In some embodiments, the stationary UWB device 900 may correspond to an anchor UWB having a known location, which may be used to determine the location of other UWB devices, including mobile UWB devices. According to some embodiments, the stationary UWB device 900 may be permanently stationary or temporarily stationary.

The stationary UWB device 900 is shown comprising hardware elements that can be electrically coupled via a bus 905 (or may otherwise be in communication, as appropriate). The hardware elements may include a processor(s) 910 which can include without limitation one or more general-purpose processors, one or more special-purpose processors (such as DSP chips, graphics acceleration processors, ASICs, and/or the like), and/or other processing structure or means. As shown in FIG. 9, some embodiments may have a separate DSP 920, depending on desired functionality. Location determination and/or other determinations based on wireless communication may be provided in the processor(s) 910 and/or wireless communication interface 930 (discussed below), according to some embodiments. The stationary UWB device 900 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The stationary UWB device 900 might also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the stationary UWB device 900 to communicate as described herein. The wireless communication interface 930 may permit data and signaling to be communicated (e.g., transmitted and received) to mobile devices, wireless network nodes (e.g., base stations, access points, etc.), and/or other network components, computer systems, and/or any other electronic devices described herein. The communication can be carried out via one or more wireless communication antenna(s) 932 that send and/or receive wireless signals 934.

As illustrated, the wireless communication interface 930 may further comprise a UWB transceiver 935. The UWB transceiver 935 may be operated to perform the UWB operations described herein. Further, the wireless communications interface 930 may comprise one or more additional communication technologies with which any OOB functionalities described herein may be performed. According to some embodiments, the UWB transceiver 935 may be one of a plurality of UWB transceivers of the stationary UWB device 900. Further, the UWB transceiver may be used for functionality in addition to the UWB positioning functionality described herein. Although illustrated as part of the wireless communication interface 930, the UWB transceiver 935 may be separate from the wireless communication interface 930 in some embodiments.

The stationary UWB device 900 may also include a network interface 980, which can include support of wireline communication technologies. The network interface 980 may include a modem, network card, chipset, and/or the like. The network interface 980 may include one or more input and/or output communication interfaces to permit data to be exchanged with a network, communication network servers, computer systems, and/or any other electronic devices described herein. In some embodiments, the stationary UWB device 900 may be communicatively coupled with one or more servers and/or other stationary UWB devices via the network interface 980.

In many embodiments, the stationary UWB device 900 may further comprise a memory 960. The memory 960 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 960 of the stationary UWB device 900 also may comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the stationary UWB device 900 (and/or processor(s) 910 or DSP 920 within stationary UWB device 900). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of ultra-wideband (UWB) sensing performed by a wireless communication device, the method comprising determining a first channel impulse response (CIR) estimation of a first frequency channel based on a radio access technology (RAT) session, wherein the RAT is different from UWB. The method also comprises determining a second CIR estimation of a second frequency channel based on a UWB session and determining a third CIR estimation of the first frequency channel based on determining a phase difference between the third CIR estimation and the first CIR estimation. The method further comprises determining a total CIR estimation for a combined frequency channel comprising the first frequency channel and the second frequency channel based on stitching the first CIR estimation, the second CIR estimation, and the third CIR estimation.

Clause 2. The method of clause 1, wherein a UWB module performing the UWB session is in an idle state when the first CIR estimation is being determined.

Clause 3. The method of clauses 1 and 2, wherein determining the phase difference between the third CIR estimation and the first CIR estimation further comprises: receiving, by the UWB module, RF signals using the first frequency channel; and determining the phase difference between the third CIR estimation and the first CIR estimation based on determining a phase difference between the received RF signals and the first CIR estimation.

Clause 4. The method of clauses 1-3, wherein determining the third CIR estimation of the first frequency channel further comprises: performing a phase-compensation to the first CIR estimation based on the determined phase difference.

Clause 5. The method of clauses 1-4, wherein the RAT session comprises: a Wi-Fi CIR session; a New-Radio (NR) CIR session; or any combination thereof.

Clause 6. The method of clauses 1-5, wherein the first frequency channel is shared by a RAT module performing the RAT session and the UWB module.

Clause 7. The method of clauses 1-6, wherein the UWB module and the RAT module share a same set of antennas configured to receive RF signals over the first and the second frequency channels.

Clause 8. A transmitting device in a wireless communication network, comprising a wireless communication interface, a memory, and one or more processing units communicatively coupled to the wireless communication interface and the memory. The one or more processing units are configured to determine a first channel impulse response (CIR) estimation of a first frequency channel based on a radio access technology (RAT) session, wherein the RAT is different from UWB. The one or more processing units are also configured to determine a second CIR estimation of a second frequency channel based on a UWB session and determine a third CIR estimation of the first frequency channel based on determining a phase difference between the third CIR estimation and the first CIR estimation. The one or more processing units are also configured to determine a total CIR estimation for a combined frequency channel comprising the first frequency channel and the second frequency channel based on stitching the first CIR estimation, the second CIR estimation, and the third CIR estimation.

Clause 9. The transmitting device of clause 8, wherein a UWB module performing the UWB session is in an idle state when the first CIR estimation is being determined.

Clause 10. The transmitting device of clauses 8 and 9, wherein to determine the phase difference between the third CIR estimation and the first CIR estimation, the one or more processing units are further configured to: receive, by the UWB module, RF signals using the first frequency channel; and determine the phase difference between the third CIR estimation and the first CIR estimation based on determining a phase difference between the received RF signals and the first CIR estimation.

Clause 11. The transmitting device of clauses 8-10, wherein to determine the third CIR estimation of the first frequency channel, the one or more processing units are further configured to: perform a phase-compensation to the first CIR estimation based on the determined phase difference.

Clause 12. The transmitting device of clauses 8-11, wherein the RAT session comprises: a Wi-Fi CIR session; a New-Radio (NR) CIR session; or any combination thereof.

Clause 13. The transmitting device of clauses 8-12, wherein the first frequency channel is shared by a RAT module performing the RAT session and the UWB module.

Clause 14. The transmitting device of clauses 8-13, wherein the UWB module and the RAT module share a same set of antennas configured to receive RF signals over the first and the second frequency channels.

Clause 15. A non-transitory computer-readable medium having instructions stored for providing driving assistance information, wherein the instructions, when executed by one or more processors of a mobile device, cause the one or more processors to determine a first channel impulse response (CIR) estimation of a first frequency channel based on a radio access technology (RAT) session, wherein the RAT is different from UWB. When executed by one or more processors of a mobile device, the instructions also cause the one or more processors to determine a second CIR estimation of a second frequency channel based on a UWB session and determine a third CIR estimation of the first frequency channel based on determining a phase difference between the third CIR estimation and the first CIR estimation. When executed by one or more processors of a mobile device, the instructions further cause the one or more processors to determine a total CIR estimation for a combined frequency channel comprising the first frequency channel and the second frequency channel based on stitching the first CIR estimation, the second CIR estimation, and the third CIR estimation.

Clause 16. The non-transitory computer-readable medium of clause 15, wherein a UWB module performing the UWB session is in an idle state when the first CIR estimation is being determined.

Clause 17. The non-transitory computer-readable medium of clauses 15 and 16, wherein determining the phase difference between the third CIR estimation and the first CIR estimation causes the one or more processors to: receive, by the UWB module, RF signals using the first frequency channel; and determine the phase difference between the third CIR estimation and the first CIR estimation based on determining a phase difference between the received RF signals and the first CIR estimation.

Clause 18. The non-transitory computer-readable medium of clauses 15-17, wherein determining the third CIR estimation of the first frequency channel causes the one or more processors to: perform a phase-compensation to the first CIR estimation based on the determined phase difference.

Clause 19. The non-transitory computer-readable medium of clauses 15-18, wherein the RAT session comprises: a Wi-Fi CIR session; a New-Radio (NR) CIR session; or any combination thereof.

Clause 20. The non-transitory computer-readable medium of clauses 15-19, wherein the first frequency channel is shared by a RAT module performing the RAT session and the UWB module.

Clause 21. The non-transitory computer-readable medium of clauses 15-20, wherein the UWB module and the RAT module share a same set of antennas configured to receive RF signals over the first and the second frequency channels.

What is claimed is:

1. A method of ultra-wideband (UWB) sensing performed by a wireless communication device, the method comprising:
    determining a first channel impulse response (CIR) estimation of a first frequency channel based on a radio access technology (RAT) session, wherein the RAT is different from UWB;
    determining a second CIR estimation of a second frequency channel based on a UWB session;
    determining a third CIR estimation of the first frequency channel based on determining a phase difference between the third CIR estimation and the first CIR estimation; and
    determining a total CIR estimation for a combined frequency channel comprising the first frequency channel and the second frequency channel based on stitching the first CIR estimation, the second CIR estimation, and the third CIR estimation.

2. The method of claim 1, wherein a UWB module performing the UWB session is in an idle state when the first CIR estimation is being determined.

3. The method of claim 2, wherein determining the phase difference between the third CIR estimation and the first CIR estimation further comprises:
    receiving, by the UWB module, RF signals using the first frequency channel; and
    determining the phase difference between the third CIR estimation and the first CIR estimation based on determining a phase difference between the received RF signals and the first CIR estimation.

4. The method of claim 3, wherein determining the third CIR estimation of the first frequency channel further comprises:
    performing a phase-compensation to the first CIR estimation based on the determined phase difference.

5. The method of claim 1, wherein the RAT session comprises:
    a Wi-Fi CIR session;
    a New-Radio (NR) CIR session; or
    any combination thereof.

6. The method of claim 2, wherein the first frequency channel is shared by a RAT module performing the RAT session and the UWB module.

7. The method of claim 6, wherein the UWB module and the RAT module share a same set of antennas configured to receive RF signals over the first and the second frequency channels.

8. A transmitting device in a wireless communication network, comprising:
    a wireless communication interface;
    a memory; and
    one or more processing units communicatively coupled to the wireless communication interface and the memory, the one or more processing units configured to:
        determine a first channel impulse response (CIR) estimation of a first frequency channel based on a radio access technology (RAT) session, wherein the RAT is different from UWB;
        determine a second CIR estimation of a second frequency channel based on a UWB session;
        determine a third CIR estimation of the first frequency channel based on determining a phase difference between the third CIR estimation and the first CIR estimation; and
        determine a total CIR estimation for a combined frequency channel comprising the first frequency channel and the second frequency channel based on stitching the first CIR estimation, the second CIR estimation, and the third CIR estimation.

9. The transmitting device of claim 8, wherein a UWB module performing the UWB session is in an idle state when the first CIR estimation is being determined.

10. The transmitting device of claim 9, wherein to determine the phase difference between the third CIR estimation and the first CIR estimation, the one or more processing units are further configured to:
    receive, by the UWB module, RF signals using the first frequency channel; and
    determine the phase difference between the third CIR estimation and the first CIR estimation based on determining a phase difference between the received RF signals and the first CIR estimation.

11. The transmitting device of claim 10, wherein to determine the third CIR estimation of the first frequency channel, the one or more processing units are further configured to:
    perform a phase-compensation to the first CIR estimation based on the determined phase difference.

12. The transmitting device of claim 8, wherein the RAT session comprises:
    a Wi-Fi CIR session;
    a New-Radio (NR) CIR session; or
    any combination thereof.

13. The transmitting device of claim 9, wherein the first frequency channel is shared by a RAT module performing the RAT session and the UWB module.

14. The transmitting device of claim 13, wherein the UWB module and the RAT module share a same set of antennas configured to receive RF signals over the first and the second frequency channels.

15. A non-transitory computer-readable medium having instructions stored for providing driving assistance information, wherein the instructions, when executed by one or more processors of a mobile device, cause the one or more processors to:
    determine a first channel impulse response (CIR) estimation of a first frequency channel based on a radio access technology (RAT) session, wherein the RAT is different from UWB;

determine a second CIR estimation of a second frequency channel based on a UWB session;

determine a third CIR estimation of the first frequency channel based on determining a phase difference between the third CIR estimation and the first CIR estimation; and determine a total CIR estimation for a combined frequency channel comprising the first frequency channel and the second frequency channel based on stitching the first CIR estimation, the second CIR estimation, and the third CIR estimation.

16. The non-transitory computer-readable medium of claim 15, wherein a UWB module performing the UWB session is in an idle state when the first CIR estimation is being determined.

17. The non-transitory computer-readable medium of claim 16, wherein determining the phase difference between the third CIR estimation and the first CIR estimation causes the one or more processors to:

receive, by the UWB module, RF signals using the first frequency channel; and determine the phase difference between the third CIR estimation and the first CIR estimation based on determining a phase difference between the received RF signals and the first CIR estimation.

18. The non-transitory computer-readable medium of claim 17, wherein determining the third CIR estimation of the first frequency channel causes the one or more processors to:

perform a phase-compensation to the first CIR estimation based on the determined phase difference.

19. The non-transitory computer-readable medium of claim 15, wherein the RAT session comprises:

a Wi-Fi CIR session;

a New-Radio (NR) CIR session; or any combination thereof.

20. The non-transitory computer-readable medium of claim 16, wherein the first frequency channel is shared by a RAT module performing the RAT session and the UWB module.

21. The non-transitory computer-readable medium of claim 20, wherein the UWB module and the RAT module share a same set of antennas configured to receive RF signals over the first and the second frequency channels.

\* \* \* \* \*